United States Patent
Ahn et al.

(10) Patent No.: US 7,394,612 B2
(45) Date of Patent: Jul. 1, 2008

(54) THIRD ORDER CURVE FIT FOR HEAD SKEW IN A HARD DISK DRIVE

(75) Inventors: Youngsub Ahn, Santa Clara, CA (US); Hoyul Bang, Saratoga, CA (US); Ken Bovatsek, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 219 days.

(21) Appl. No.: 11/375,314

(22) Filed: Mar. 13, 2006

(65) Prior Publication Data

US 2007/0258165 A1 Nov. 8, 2007

(51) Int. Cl.
*G11B 5/596* (2006.01)
(52) U.S. Cl. .................................... 360/77.04
(58) Field of Classification Search ............... None
See application file for complete search history.

(56) References Cited

U.S. PATENT DOCUMENTS

| | | | | |
|---|---|---|---|---|
| 5,982,173 A * | 11/1999 | Hagen | ............... | 360/77.04 |
| 6,650,491 B2 * | 11/2003 | Suzuki et al. | ............ | 360/77.02 |
| 6,693,763 B2 * | 2/2004 | Bi et al. | ........................ | 360/75 |
| 6,765,744 B2 * | 7/2004 | Gomez et al. | ................. | 360/75 |
| 6,781,786 B2 * | 8/2004 | Ishii | ........................ | 360/78.04 |
| 6,873,488 B2 * | 3/2005 | Teo et al. | ................. | 360/77.06 |
| 6,947,248 B2 * | 9/2005 | Allen et al. | ............... | 360/77.04 |
| 7,173,788 B2 * | 2/2007 | Nakamura et al. | ....... | 360/77.08 |
| 7,271,977 B1 * | 9/2007 | Melrose et al. | .......... | 360/77.04 |

* cited by examiner

*Primary Examiner*—Hoa T. Nguyen
*Assistant Examiner*—James L Habermehl
(74) *Attorney, Agent, or Firm*—Ben J. Yorks; Irell & Manella LLP

(57) ABSTRACT

A hard disk drive that utilizes a third order curve fit equation to generate a skew table for a head of a hard disk drive. The skew table is used to compensate for offset between a write element and a read element of the head at different radial positions of a disk. A linear algebraic matrix equation can be used to solve the third order equation using offset values measured at different radial positions of the disk.

11 Claims, 3 Drawing Sheets

THIRD ORDER CURVE FIT FOR HEAD SKEW IN A HARD DISK DRIVE

BACKGROUND OF THE INVENTION

1. Field of the Invention

The present invention relates to a process to generate a skew table for a head of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks between the inner and outer diameters of the disks.

The tracks have servo information that is used to center the heads relative to the tracks. The heads typically have a write element for writing information and a separate read element for reading information on the disks. The read element is typically offset from the write element relative to the center of a track. Consequently, centering the read element will not necessarily center the write element and vice versa. The offset will vary for different radial positions of the disks.

Some disk drives have a skew table that contains offset values for various radial disk positions. The offset values in the skew table are used to adjust the position of the heads to center the read and write elements. The skew table is generated by measuring the offset at different radial positions. Offset values for non-measured radial positions are interpolated from the measured values. As track densities increase more measured offset values are required to generate an accurate skew table. Taking more measurements increases the time required to generate the skew table and the overall time to manufacture disk drives. An increase in process time decreases production efficiency for mass producing hard disk drives. It would be desirable to minimize the time required to generate a skew table.

BRIEF SUMMARY OF THE INVENTION

A hard disk drive that generates a skew table for a head of hard disk drive utilizing a third order curve fit equation.

DETAILED DESCRIPTION

Described is a hard disk drive that utilizes a third order curve fit equation to generate a skew table for a head of a hard disk drive. The skew table is used to compensate for offset between a write element and a read element of the head-at different radial positions of a disk. A linear algebraic matrix equation can be used to solve the third order equation using offset values measured at different radial positions of the disk. The third order equation can provide accurate offset values while using a minimal amount of measured offset data.

Figure 1:
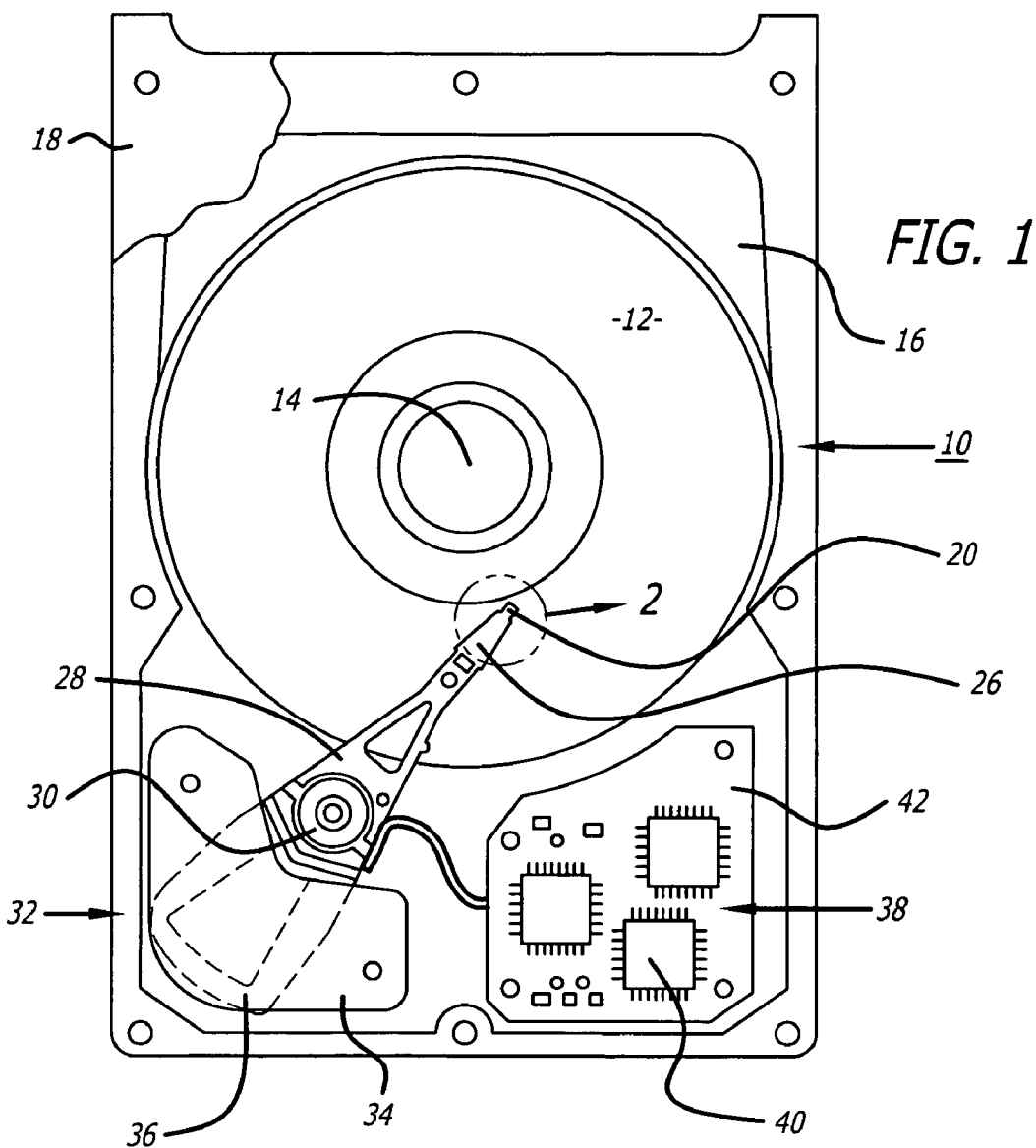
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
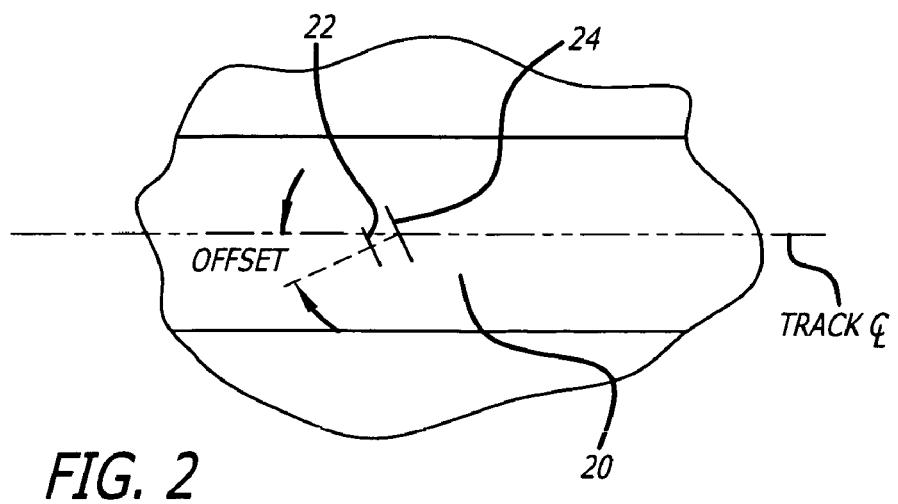
FIG. 2 is a top enlarged view of a head of the hard disk drive.

The disk drive 10 may include a plurality of heads 20 located adjacent to the disks 12. As shown in FIG. 2 each head 20 may have a write element 22 and a separate read element 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

As shown in FIG. 2, there is an OFFSET between the center of the read element 24 and the center of the write element 22 relative to the center of the track. The OFFSET is caused by the oblique orientation relative to the track. Manufacturing processes may also introduce additional offset between the elements 22 and 24. The OFFSET varies for different radial track positions.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
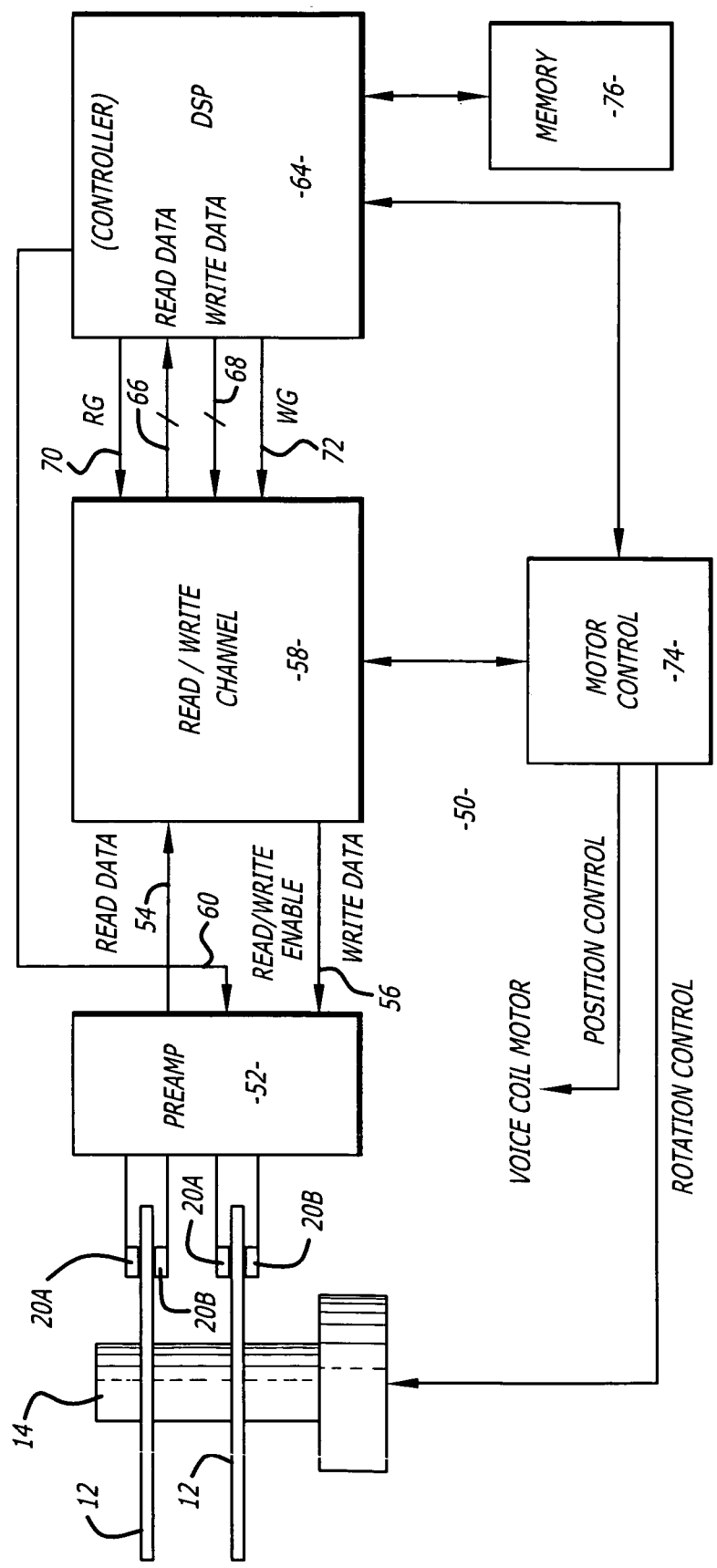
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. Each disk 12 may included a first head 20A and a second head 20B. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64. The disk drive may also have volatile RAM memory (not shown).

The controller 64 can perform a routine to generate a skew table that is stored on the disk 12, the memory device 76 or some other memory. The skew table contains a plurality of offset values for different radial disk positions. The servo routine of disk drive utilizes the offset values to center the read and write elements relative to the center of a track.

The offset values for the skew table can be generated with the following third order curve fit equations.

$$y = b_0 + b_1 x + b_2 x^2 + b_3 x^3 \quad (1)$$

Where y is the offset value, x is the radial disk position and $b_0$, $b_1$, $b_2$ and $b_3$ are constants.

The third order curve fit equation can be solved with the following linear algebraic matrix equation.

$$V = k^{-1} c \quad (2)$$

Where;

$$V = \begin{bmatrix} b_0 \\ b_1 \\ b_2 \\ b_3 \end{bmatrix} k = \begin{bmatrix} \sum x_i^0 & \sum x_i^1 & \sum x_i^2 & \sum x_i^3 \\ \sum x_i^1 & \sum x_i^2 & \sum x_i^3 & \sum x_i^4 \\ \sum x_i^2 & \sum x_i^3 & \sum x_i^4 & \sum x_i^5 \\ \sum x_i^3 & \sum x_i^4 & \sum x_i^5 & \sum x_i^6 \end{bmatrix} c = \begin{bmatrix} \sum y_i \\ \sum y_i x_i \\ \sum y_i x_i^2 \\ \sum y_i x_1^3 \end{bmatrix}$$

$x_i$ is the radial disk position and $y_i$ is the offset measured at the radial disk position $x_i$.

Figure 4:
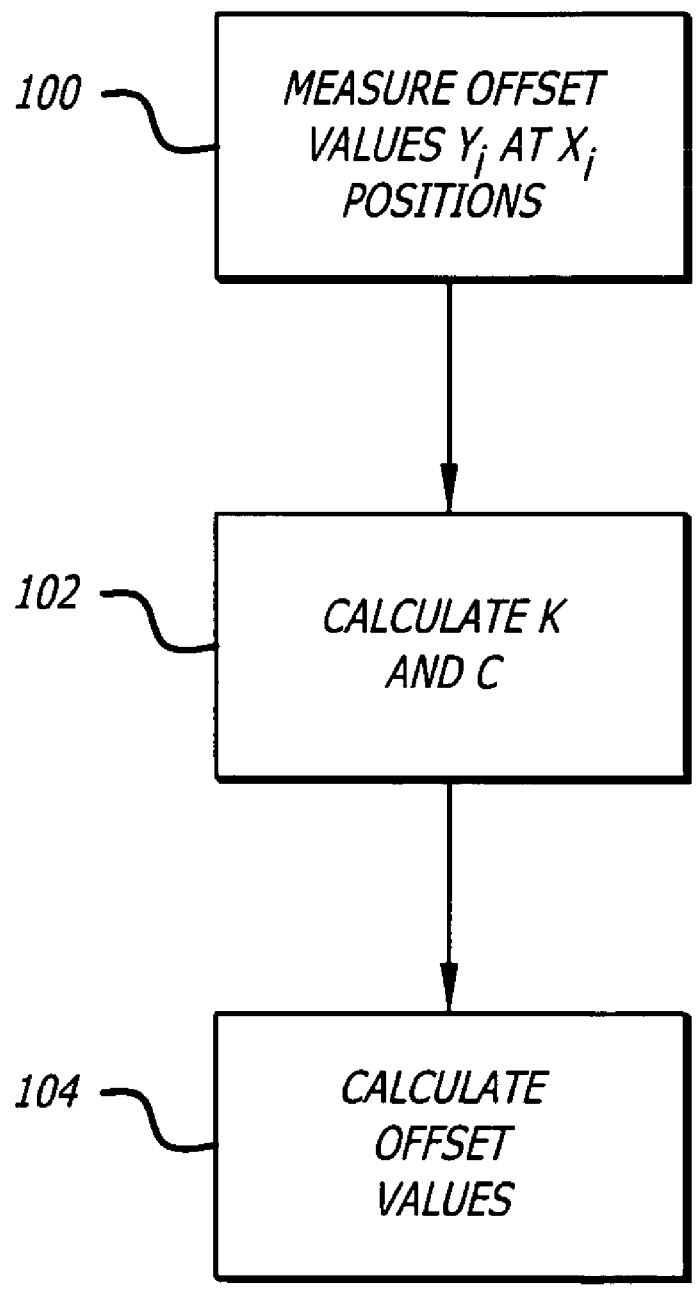
FIG. 4 is a flowchart of a process for generating a skew table.

FIG. 4 shows a flowchart describing a process for generating a skew table. Initially a number of offset values $y_i$ are measured at various radial disk positions $x_i$ in block 100. By way of example, the offset values may be measured at 12 different radial track positions. These values may be provided by an existing skew table. Values for K and C are calculated from the $x_i$ and $y_i$ values in block 102. The matrix v can be determined from equation (2) to determine the constants $b_0$, $b_1$, $b_2$ and $b_3$ for the third order equation. Using equation (1) a number of offset values are calculated and placed in a skew table in block 104. By way of example, the skew table may contain 24 different offset values, twice as many values that were measured in block 100. This process thus allows for the generation of multiple offset values while minimizing the amount of measured data.

The process is repeated for each head of the disk drive. The process can be performed for both an MR skew table and a servo skew table. The accuracy of the equation can be checked by comparing a calculated offset value with a measured offset value. If the calculated value is different by a predetermined range or percentage then the third order equation is deemed invalid. By way of example, the calculated value is acceptable if within 15% of the measured value.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk, said head having a read element and a write element;
   an actuator arm coupled to said head;
   a voice coil motor coupled to said actuator arm; and,
   a processor that determines offset values for a skew table with a third order curve fit equation that is solved with a linear algebraic matrix equation, said skew table containing a plurality of offset values for said read and write elements of said head.

2. The hard disk drive of claim 1, wherein said linear algebraic matrix equation includes offset values measured at different radial locations of said disk.

3. The hard disk drive of claim 1, further comprising memory that stores said skew table.

4. The hard disk drive of claim 1, wherein said skew table is stored on said disk.

5. A hard disk drive, comprising:
   a disk;
   a head coupled to said disk, said head having a read element and a write element;
   an actuator arm coupled to said head;
   a voice coil motor coupled to said actuator arm; and,
   processor means for determining offset values for a skew table with a third order curve fit equation, said skew table containing a plurality of offset values for said read and write elements of said head.

6. The hard disk drive of claim 5, wherein said third order curve fit equation is solved with a linear algebraic matrix equation.

7. The hard disk drive of claim 6, wherein said linear algebraic matrix equation includes offset values measured at different radial locations of said disk.

8. The hard disk drive of claim 5, further comprising memory means for storing said skew table.

9. The hard disk drive of claim 8, wherein said memory means includes said disk.

10. A method for generating a skew table for a head of a hard disk drive, comprising:
    measuring a plurality of offset values for a head at different radial positions of a disk;
    calculating values for a skew table with the offset values and a third order curve fit equation that is solved with a linear algebraic matrix equation; and,
    storing the skew table.

11. The method of claim 10, further comprising comparing a calculated offset value against a measured offset value to determine whether the calculated value is within a predetermined range from the measured value.

* * * * *